Figure 1:
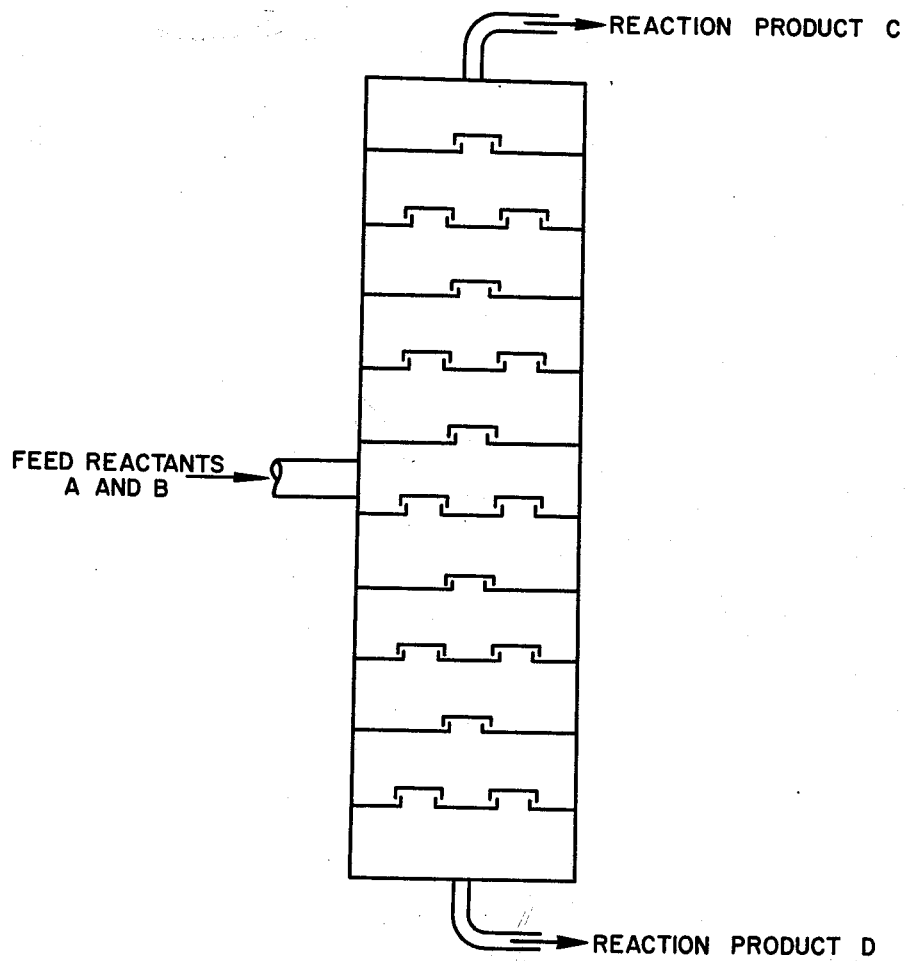

Jan. 8, 1963 R. A. CARPENTER ET AL 3,072,704
CONTINUOUS PRODUCTION OF TRIALKYL BORATES
Filed July 12, 1954 3 Sheets-Sheet 1

Richard A. Carpenter
Roland L. Hughes
Jack D. Bush
INVENTORS
BY Neal J. Mosely
their Attorney

United States Patent Office 3,072,704
Patented Jan. 8, 1963

3,072,704
CONTINUOUS PRODUCTION OF TRIALKYL BORATES
Richard A. Carpenter, Prairie Village, Kans., and Roland L. Hughes and Jack D. Bush, Kansas City, Mo., assignors to Callery Chemical Company, Pittsburgh, Pa., a corporation of Pennsylvania
Filed July 12, 1954, Ser. No. 442,501
13 Claims. (Cl. 260—462)

This invention relates to a new and useful process for preparing a volatile chemical compound and separating the volatile compound from the reactants and other reaction products by fractional distillation, and more particularly to a process for preparing trialkyl borates by the reaction of boric acid and an alcohol in a distillation column and separating the trialkyl borate and water which are formed in the reaction by fractional distillation.

Trialkyl borates in general and trimethyl borate in particular have proved to be of considerable importance in the past as welding fluxes and fuel additives, and also as intermediates in the preparation of other boron compounds such as the boro-hydrides.

The trialkyl borates, or borate esters, have been made in the past by a simple esterification reaction of boric acid and an alcohol which reaction produces the appropriate trialkyl borate and water as a by-product of reaction. The reaction has been carried out by heating and stirring the boric acid and alcohol together with the alcohol being present in a very substantial excess. The excess alcohol forms an azeotropic mixture with the water of reaction and is distilled out of the reaction vessel leaving the trialkyl borate reaction product in the distillation pot. This process is applicable to the preparation of all of the lower trialkyl borates except trimethyl borate. Methanol and water do not form an azeotrope while methanol and trimethyl borate form a binary minimum boiling azeotrope containing about a 1 to 1 molar ratio of trimethyl borate to methanol. The production of trimethyl borate therefore involves the separation of the trimethyl borate azeotrope from the water of reaction and the subsequent separation of the trimethyl borate from the azeotrope.

Prior workers in the field have reported the formation of trimethyl borate or the trimethyl borate-methanol azeotrope from the reaction of boric acid or boric oxide and methanol in yields of 65 to 97% by simply mixing the reactants and distilling off the azeotrope. This process however is extremely inefficient and requires the use of a fractionating column having a very high reflux ratio, using a very large excess of methanol, and taking a relatively long time for the reaction. Appel in U.S. Patent 2,217,354 claims yields as high as 95.3% from the distillation of mixtures of methanol and boric acid. Appel's process however required very high ratios of methanol to boric acid, a large number of theoretical plates for separation of the azeotrope and very high reflux ratios (in fact reflux ratios as high as 600 to 1 are suggested as being necessary for complete recovery at the end of the reaction). It should also be noted that the Appel process required 26 hours to reach 90% yields of trimethyl borate. Other experimental work which has been reported in the literature (J.A.C.S. 75, 213 (1953)) reports the formation of trimethyl borate in 96.7% yields in the form of the trimethyl borate-methanol azeotrope by distillation of the azeotrope from a reaction mixture of boric oxide and methanol. This reaction proceeds more rapidly than the reaction reported in the Appel patent but has substantial defects due to the difficulty in handling boric oxide and also the high cost of boric oxide as compared to boric acid.

The above mentioned processes while being operative processes are subject to the defects of (1) being limited to batch type production (2) requiring an excessive amount of methanol (3) requiring too long a time for good yields or (4) requiring equipment or reactants which are too expensive or by which quantitative yields are unattainable.

It is therefore one of the objects of this invention to provide a new and improved process for the carrying out of a chemical reaction which produces volatile reaction products, in which process the reaction is carried out in the central portion of a distillation column and the reaction products are separated by fractional distillation and separately removed from the column so as to favorably affect the equilibrium of the reaction.

Another object of this invention is to provide an improved process for carrying out a chemical reaction continuously and continuously separating and removing from the reaction zone the products of reaction.

Another object of this invention is to provide a new and improved method for continuously preparing a trialkyl borate.

Another object of this invention is to provide a new and improved process for preparing trialkyl borates in which the boric acid and an alcohol are introduced into the central portion of a distillation column and a trialkyl borate is removed from one portion of the column and water of reaction is removed at another portion of the column.

Another object of this invention is to provide a new and improved process for the continuous preparation of trimethyl borate.

Another object of this invention is to provide a new and improved process for the preparation of trimethyl borate in which the water of reaction is continuously removed from the reaction zone to prevent hydrolysis of the trimethyl borate reaction product.

Another object is to provide a new and improved process for the continuous preparation of trimethyl borate, in which process methanol and boric acid are introduced into the central portion of a distillation column and trimethyl borate-methanol azeotrope is removed overhead in the column and water of reaction is removed from the bottom of the column.

Other objects of this invention will become apparent from time to time throughout the specification and claims as hereinafter related.

Figure 2:
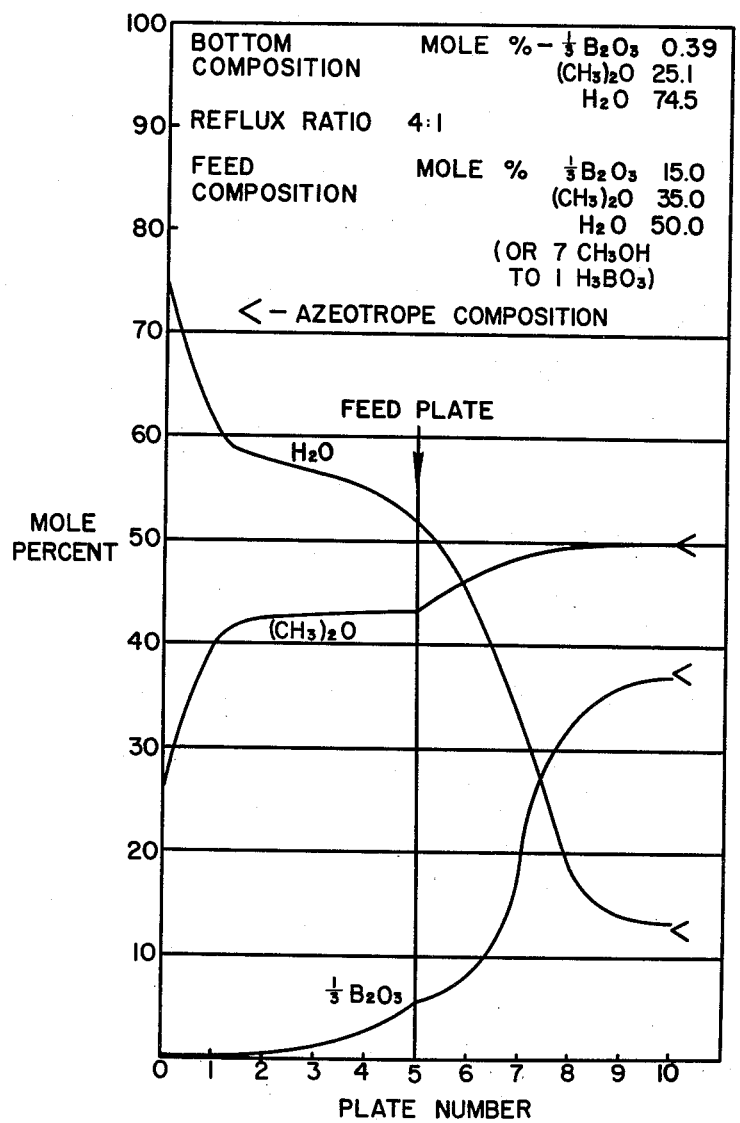
Figure 3:
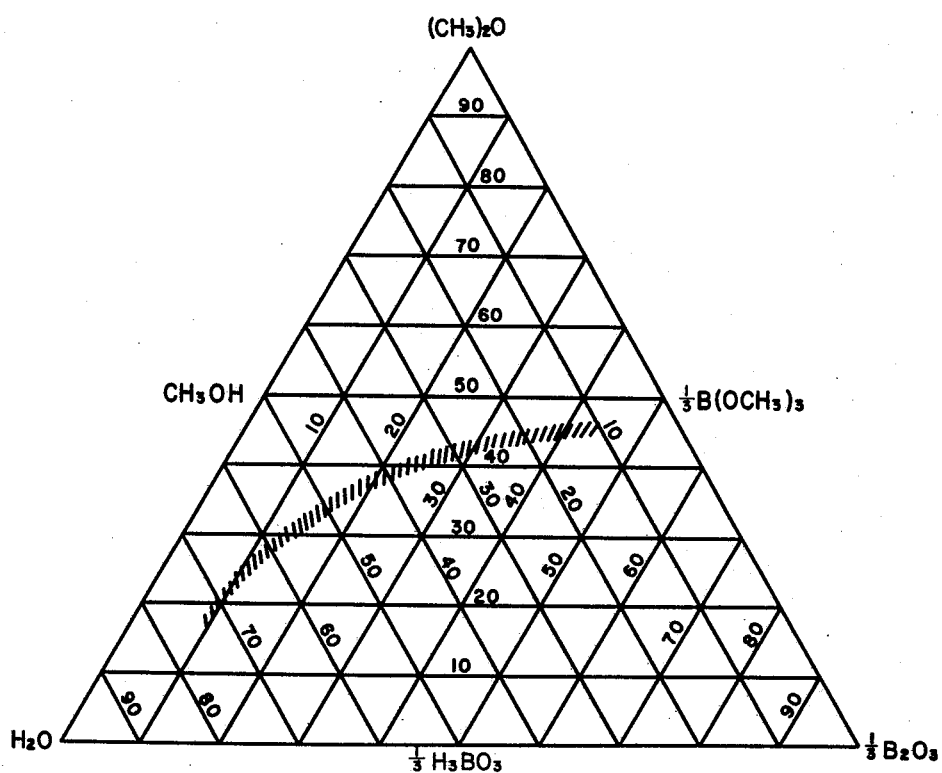

In the accompanying drawings to be taken as part of this specification, there are shown certain diagrammatic and graphical data which assist in the understanding of this invention, in which drawings:

FIG. 1 is a diagrammatic view of a fractional distillation column having a center feed for introducing two chemical reactants A and B and having top and bottom connections for removal of reaction products C and D, FIG. 2 is a graph showing the variation in composition of the reaction mixture from plate to plate in the distillation column when this column is used for the preparation of trimethyl borate from methanol and boric acid, and FIG. 3 is a triangular graph showing the equilibrium data for the systems water-boric oxide-methyl ether, which is used for distillation calculations.

This invention is based on the discovery that a chemical reaction which requires the separation of liquid reaction products for the reaction to go to completion may be carried out continuously by introducing the reactants into the central portion of a distillation column and separating the reaction products by fractional distillation. In particular this invention is based on the preparation of a trialkyl borate by the reaction of boric acid and an alcohol in a distillation column wherein the trialkyl borate is separated from the water of reaction by fractional distillation.

In the development of this invention preliminary studies were undertaken of the reaction of alcohols with boric acid to produce trialkyl borates and more particularly the reaction of methanol with boric acid to prepare trimethyl borate. The preparation of the higher trialkyl borates (triethyl and above) is relatively simple due to the fact that when the alcohol and boric acid react the water of reaction forms an azeotrope with the excess alcohol present and may be removed by simple distillation leaving the pure trialkyl borate in the distillation pot. This type of process however is not applicable to the continuous production of trialkyl borates and is not applicable at all to quantity production of trimethyl borate. This is due to the fact that methanol does not azeotrope with water. Methanol however does form a low boiling azeotrope with trimethyl borate which may be removed overhead by distillation from a batch reactor. In view of the fact that previously reported work on the preparation of trimethyl borate indicated that very large excesses of methanol were required and that distillation equipment of a very large number of plates and having an extremely high reflux ratio was also required in order to obtain a satisfactory yield, various possible processes were considered which might force this reaction to completion and also permit continuous operation. One of the possibilities that was considered was the use of even larger excesses of methanol to force the reaction to completion by mass action, and removal of the trimethyl borate by distillation. This approach was found to be impractical due to the expensive distillation equipment required and the necessity of reclaiming large amounts of methanol from the water of reaction. Another possibility which was considered was the removal of the water of reaction by the use of boric oxide or some other desiccant and thereby producing a pure trimethyl borate-methanol azeotrope with the production of water which would tend to slow down the reaction. This method, upon a cursory investigation, proved to be uneconomical and not readily adaptable to a continuous process.

While considering these various methods of removing water from the reaction zone it occurred to us that if the reaction were carried out in the center of a distillation column instead of at the bottom of the column the lower stripping section of the column would remove the water from the reaction zone and permit the continuous introduction of reactants and the continuous removal of both the water of reaction and the trimethyl borate azeotrope which are formed as products of reaction. We therefore carried out various experiments with the reaction of boric acid and methanol to determine whether this reaction occurs rapidly enough to make such a process feasible. It was found as a result of these experiments that the reaction was sufficiently rapid to make separation of the reaction products by fractional distillation feasible. However, when the first reactions were carried out in a center-feed column it was found that the reaction produced only about a 65–70% yield and also that there was a substantial loss of boron (in the form of boric acid) to the bottom of the column where the boric acid had to be separated from the methanol and water. Further work developed the fact that if the feed point to the column was located too low there was a loss of boron to the bottom of the column, and that if the feed point to the column was located too high relative to the top of the column there was an insufficient separation of trimethyl borate azeotrope from the methanol. Eventually we discovered that if the loss of boron to the bottom of the column was to be held to less than 1% the feed point to the column had to be located at least 5 plates above the bottom of the column, and that it was necessary to have about 5 plates above the feed point to provide a substantially complete separation of the trimethyl borate azeotrope from the methanol in the reaction column. Based on these factors runs were made with a center feed column having a feed point located at least 5 plates above the bottom of the column using different reflux ratios and different molar ratios of methanol to boric acid. Thus, we found that quantitative production of trimethyl borate can be obtained with reflux ratios as low as 4 to 1 and also that a minimum molar ratio of methanol to boric acid of about 7 to 1 is required for complete reaction of the boric acid.

After this process was found to work satisfactorily under the conditions above described further runs were made to obtain data for engineering calculations for designing a large reaction column for continuous operation. At first it appeared impossible to make any definite calculations for designing such a column because of the fact that the process does not involve a homogeneous distillation. In the center of the column a reaction is continuously taking place. In the upper part of the column the trimethyl borate azeotrope is being fractionated from methanol while in the lower part of the column methanol and water of reaction are being fractionated. It was decided, however, that sufficient data could be obtained by mixing different proportions of water, methanol and trimethyl borate and studying their equilibrium in an Othmer still. It was found necessary, however, to represent these data on a triangular chart (FIG. 3) on which the three vertices are $H_2O$, $B_2O_3$, and $(CH_3)_2O$, with $CH_3OH$, $H_3BO_3$, and $B(OCH_3)_3$ being represented by intermediate points. On this chart a dashed line is used because of the fact that a phase separation occurs in the region of the equilibrium line which does not permit the drawing of a solid line. When these data were obtained it was possible to make calculations which were plotted on a chart (shown in FIG. 2) based on the assumption of a substantially complete reaction adjacent the center plate and fractionation of the components $CH_3OH$ and $B(OCH_3)_3$, and $CH_3OH$ and $H_2O$, respectively above and below the center feed plate. These calculations were based on a reflux ratio of 4 to 1 and a molar ratio of methanol to boric acid of about 7 to 1 and show the theoretical plate to plate changes in composition. These calculations on the chart in FIG. 2 confirm our discovery that there is a definite minimum height in the column for introduction of the feed if an excessive loss of boron to the bottom column is to be avoided and proper separation of the trimethyl borate azeotrope is to be obtained. With these experimental data and calculations as plotted in FIGS. 2 and 3 it is possible to design a commercial size distillation column which may be continuously operated for carrying out this process.

While the engineering data for this process were developed principally for the production of trimethyl borate it is obvious that this process may be used for the preparation of other trialkyl borates. When this process is used for the preparation of other trialkyl borates the alcohol and boric acid are introduced at the center of the column and the appropriate trialkyl borate is withdrawn from the bottom of the column and an alcohol-water azeotrope is removed from the top of the column. It should also be noted that as indicated in FIG. 1 of the drawings this process is applicable generally to the continuous reaction of any two reactants A and B which react to produce reaction products C and D which are separable by fractional distillation. In considering this process in its broadest terms the reactants A and B are fed into the central portion of a distillation column and reaction product C is withdrawn overhead and reaction product D withdrawn from the bottom of the column. This process is therefore applicable to any reaction where it is desired to continuously separate and withdraw from the reaction zone (the central portion of the distillation column) the products of reaction. As in the case of trimethyl borate this process is obviously applicable to other chemical reactions where the removal of one of the reaction products is necessary in order to prevent a reversal of the reaction.

Having thus described this process and the best mode of performing said process presently known as required by the patent statutes we wish it to be understood that within the scope of the appended claims this invention may be practiced otherwise than as specifically described.

Having thus described our invention fully and completely, what we desire to claim and secure by Letters Patent of the United States is:

1. A method of preparing a trialkyl borate which comprises introducing boric acid and an alcohol into the central portion of a distillation column and allowing said boric acid and alcohol to react within said column to produce a trialkyl borate and water, separating the trialkyl borate and water in said column by fractional distillation, and removing the trialkyl borate and water respectively from opposite ends of said column.

2. A method according to claim 1 in which the reactants are continuously introduced into the column and the reaction products are continuously removed from the top and bottom of the column.

3. A method according to claim 1 in which the alcohol is introduced in a substantial stoichiometric excess.

4. A method according to claim 1 in which one of the reaction products is removed overhead as an azeotrope with alcohol.

5. A method of preparing trimethyl borate $B(OCH_3)_3$ which comprises introducing boric acid and methanol into the central portion of a distillation column and allowing said boric acid and methanol to react within said column to produce trimethyl borate and water, separating the trimethyl borate and water by fractional distillation in said column, and removing the trimethyl borate from the top of said column as the trimethyl borate-methanol azeotrope and removing water from the bottom of said column.

6. A method according to claim 5 in which the boric acid and methanol are continuously introduced into the column and the trimethyl borate-methanol azeotrope and water of reaction are continuously withdrawn from the column.

7. A method according to claim 5 in which the reactants are introduced into the column at a plate level resulting in a concentration of less than 1% unreacted boron in the liquor withdrawn from the bottom of the column.

8. A method of preparing trimethyl borate $B(OCH_3)_3$ which comprises introducing methanol and boric acid into a distillation column of at least 10 theoretical plates at a point below the top thereof and not less than five theoretical plates from the bottom of the column, reacting said acid and alcohol in said column, distilling trimethyl borate-methanol azeotrope from the top of the column and recovering the same, and removing the water of reaction from the bottom of the column.

9. A method according to claim 8 in which the methanol and boric acid are continuously introduced into the column and the trimethyl borate-methanol azeotrope and water of reaction are continuously withdrawn from the column.

10. A method according to claim 8 in which the methanol is introduced in a substantial stoichiometric excess.

11. A method according to claim 10 in which the molar ratio of methanol to boric acid is not less than 7 to 1.

12. A method according to claim 10 in which the reactants are continuously introduced into the column and the reaction products are continuously withdrawn from the column.

13. A method according to claim 12 in which said reactants are introduced into said column at a point at least five theoretical plates from the top thereof.

References Cited in the file of this patent

UNITED STATES PATENTS

| | | |
|---|---|---|
| 2,217,354 | Appel | Oct. 8, 1940 |
| 2,587,753 | O'Connor et al. | Mar. 4, 1952 |
| 2,642,453 | Lippincott | June 16, 1953 |
| 2,697,030 | Haufe et al. | Dec. 14, 1954 |

OTHER REFERENCES

Perry: Chemical Engineer's Handbook, publ. by McGraw-Hill (New York), 3rd Edition (Textbook Edition), 1950; page 618, column 2 relied on.